March 1, 1966     S. GAULEY     3,238,533
RECORDER PEN
Filed March 12, 1964
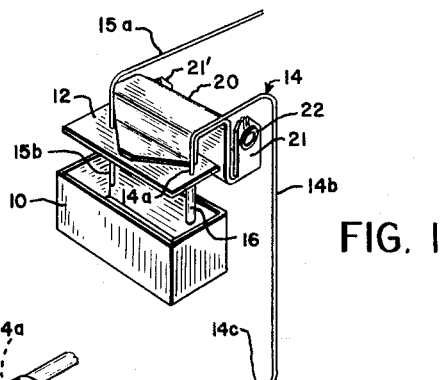
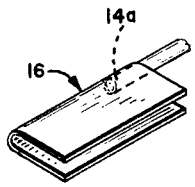
FIG. 5
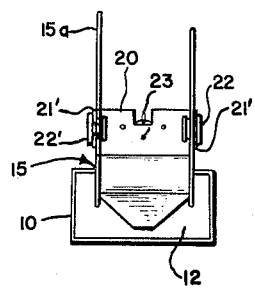
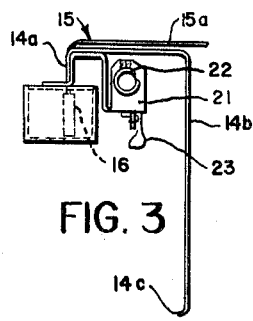
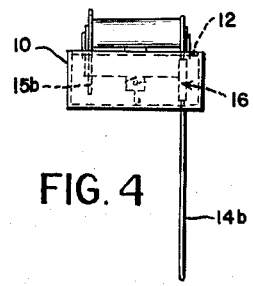
SHERMAN GAULEY
INVENTOR.
BY Frank C. Parker
David E. Dougherty
ATTORNEYS 3,238,533
RECORDER PEN
Sherman Gauley, Irondequoit, N.Y., assignor to Bausch & Lomb Incorporated, Rochester, N.Y., a corporation of New York
Filed Mar. 12, 1964, Ser. No. 351,377
5 Claims. (Cl. 346—140)

This invention relates to a novel recorder pen of the type used in strip chart recorders or the like.

Strip chart recorders have come into widespread use in conjunction with electrical test equipment. Recorders of this type are responsive to frequent changes indicated by the electrical equipment. These changes are often rapid and require a pen to move a relatively long distance in a relatively short interval of time. At other times the pen is moved over a comparable lesser distance during a similar time interval. It is desirable therefore to have a pen wherein the flow of ink is responsive to rapid changes and thereby will produce a relatively uniform line notwithstanding relatively large changes in the rate of movement.

There have been several relatively successful approaches for overcoming the problems inherent in such recording instruments. These approaches may be divided into two classes, i.e. the capillary pens and those pens which include an axially movable needle within the stylus. These classes are exemplified by the U.S. patents of Summers, Jr. et al. 3,046,556 and Sherman Gauley 3,094,104 respectively.

A recorder pen according to the present invention is a capillary type pen, which is adapted to replace a pen having an axially movable needle. It has been found desirable in some cases to replace the movable needle type pen with a capillary type. In making this replacement, it has also been found desirable to dispose the stylus or writing point at a position which is substantially below the level of the ink supply. This feature is particularly desirable in a strip chart recorder wherein a record sheet is movable in a vertical direction and the pen is movable horizontally across the top of the instrument in response to changes indicated by the electrical equipment.

Disposing the writing point below the surface of the reservoir presents an additional problem. For example, venting the reservoir causes an excess of ink to flow onto the paper. One approach to solving this problem is to dispose the vent which connects the inner portion of the reservoir with the outside below the ink level. Venting in this manner, however, presents a problem when it is desired to fill the reservoir without opening the reservoir. Filling pens of the type used in strip chart recorders have produced a significant amount of difficulty. Numerous complaints have been voiced in response to ink spillage or because ink is forced through the stylus and onto the chart.

It is particularly desirable to fill the reservoir without removing the pen from the recorder. Advantageously the present pen may be filled without removing it from the recorder, and the tendency to leak and spill ink has been substantially reduced. Furthermore the aforementioned advantages have been obtained without an appreciable increase in the cost of the pen. In fact, the costs of the present pen are presently thought to be substantially less than those pens which utilize an axially movable needle.

Recorder pens according to the present invention are of relatively simple construction, durable, easy to clean and service and are designed to utilize ink which is available in the relatively inexpensive bulk containers. The pens are not dependent upon the expensive cartridge type reservoirs which have a relatively small supply of ink and yet offer many of the advantages previously associated with the cartridge type pens.

Briefly, a recorder pen according to the present invention includes means defining a reservoir which is adapted to hold a supply of ink. A top is adapted to close the reservoir and may be an integral part thereof. Preferably the top is a separate removable part which is slightly larger than the upper portion of the reservoir, so that, the top may be forced into the reservoir to thereby form a seal. A rigid capillary tube extends into the top portion of the reservoir and an outer portion thereof extends downwardly to a point substantially below the normal level of the ink supply. Channel means defining an opening at the upper end thereof are connected to the inner portion of the capillary tube and connects the inner portion of the tube with the lower portion of the reservoir. The channel means preferably comprises a U-shaped channel having inner dimensions which are approximately the same as the outer dimensions of the capillary tube. A vent tube is also disposed in the reservoir below the normal level of the ink supply and extending outwardly of the reservoir to thereby provide a vent.

The pen may be filled by forcing ink inwardly through the vent by inserting a squeeze bottle on the outer end of the vent and forcing the ink through the vent. During the filling operation the opening defined by the channel means vents the reservoir to thereby relieve the pressure as the reservoir is filled. After filling the reservoir, the ink flows upwardly through the channel means and out through the capillary tube which terminates in a stylus.

The invention will now be described in connection with the accompanying drawing; in which, FIG. 1 is an exploded perspective view of a recorder pen according to the present invention;

FIG. 2 is a top view of the recorder pen shown in FIG. 1;

FIG. 3 is a side elevational view of a recorder pen shown in FIGS. 1 and 2;

FIG. 4 is a front elevational view of the recorder pen shown in FIGS. 1–3; and,

FIG. 5 is an enlarged perspective view of the fluid channel means utilized in the novel pen according to the present invention.

The recorder pen shown in FIGS. 1–4 includes a reservoir 10. According to the presently preferred embodiment of the invention, the reservoir 10 defines a generally rectangular box like shape. The preference for the box like shape stems from the perviously used pens having axially movable needles within the stylus. The present shape is generally compact and is generally symmetrical to thereby provide an even balance as it is moved from side to side in a recorder. The body of the reservoir 10 preferably consists of a non-wettable plastic such as polyethylene, polypropylene or the like.

A top 12 of the reservoir 10 preferably consists of a flat metal plate which is forced or wedged between the upwardly disposed sides to thereby seal the reservoir. It may in some cases be desirable to cement the member to the body, however, it is presently preferred to so construct and arrange the top 12, so that, it is slightly larger than the shape defined by the upwardly extending walls of the reservoir 10. The top 12 should for example, be sufficiently large to form a relatively tight fit and will therefore form a seal as well as support the weight of the filled reservoir. In some cases, it may be desirable to form a lip or groove on the inner sides of the walls to thereby receive the top 12.

A relatively long capillary tube 14 passes through the top 12 and connects the inner and outer portion of the reservoir. The tube 14 is generally J-shaped with the short portion 14a passing through the top 12 and the long portion 14b extending downwardly to a point below the reservoir. The long portion 14b terminates in a writing stylus or pen point 14c.

An L-shaped filler tube 15 also extends through the top 12 and into the reservoir 10. The filler tube 15 extends substantially to the bottom of the reservoir 10. Preferably the outward portion 15a is relatively long with respect to the inner portion 15b and extends to a substantial distance from the pen. A small squeeze bottle of ink is inserted on this tube and squeezed in order to force the ink through the tube and into the reservoir. When the ink bottle is removed, the tube acts as a vent which is disposed below the level of the ink supply.

Conduit means 16 are disposed in the reservoir 10 and are connected to the short portion 14a of the tube 14. The conduit means 16 defines at least a small opening in the upper portion on one side thereof. Preferably the conduit means defines a U-shaped channel which is open along one side thereof. When it is desired to fill the reservoir the ink is inserted through the tube 15 to thereby fill the reservoir. The opening defined by the conduit means 16 acts as a vent so that ink is not forced outwardly through the tube 14. If for example the conduit were fully closed and the reservoir sealed the pressure inside the reservoir would be increased and any ink inserted therein would be forced through the tube 14 and onto the strip chart. During the filling operation, the opening defined by the conduit 16 acts as a vent and allows the reservoir to be filled up to the level where the portion 14a extends into the reservoir. During the operation of the pen the ink will flow upwardly through the conduit 16 through the tube 14a and out the stylus 14c onto the paper.

As illustrated in FIG. 5 the conduit means defines a generally U-shaped channel with an inside diameter slightly larger than the outside diameter of the portion 14a. In some cases this channel may be partially closed, i.e., by forcing the ends inwardly toward each other to thereby define a keyhole type passage. It is also possible to utilize a tube having a hole drilled at the upper portion of the reservoir to thereby provide the venting desired.

In the operation of the device the assembly is mounted by means of the carriage 20. The carriage 20 is fixed to the top 12 and includes mounting members 21, 21'. A pair of bearings 22, 22' are disposed in the members 21, 21' and are adapted to slide on a rod (not shown) as the pen is moved translationally across the chart. A clip 23 is also fixed to the carriage 20 and is used to fix the carriage to a movable member not shown. The movable member propels the pen along the horizontally disposed rod in response to the electrical impulses received by the recorder.

While the preferred embodiment of the invention has been shown for illustrative purposes, it should be understood that the devices according to the present invention may be modified and embodied in different forms without departing from the spirit or scope of the appended claims.

What is claimed is:

1. A recorder pen comprising means defining a reservoir for holding a supply of ink, a top adapted to close said reservoir, a rigid tube of capillary dimensions having an inner end extending into the top portion of said reservoir and an outer portion defining a stylus and extending downward to a point below said reservoir to thereby provide an ink outlet from said reservoir, conduit means disposed within said reservoir and extending substantially to the bottom thereof, said conduit means extending from the inner end of said tube and defining at least a partial opening in its upper portion, a vent tube extending substantially to the bottom of said reservoir whereby said reservoir is vented from below the ink level when the pen is in an operative position.

2. A recorder pen comprising means defining a reservoir for holding a supply of ink, a removable top adapted to close said reservoir, a rigid tube of capillary dimensions having an inner end extending through the top of said reservoir and an outer portion defining a stylus and extending downward to a point below said reservoir to thereby provide an ink outlet from said reservoir, conduit means disposed within said reservoir and extending substantially to the bottom thereof, said conduit means connected to the inner end of said tube and defining at least a partial opening in its upper portion, a vent tube passing through said top and extending substantially to the bottom of said reservoir whereby said reservoir is vented from below the ink level when the pen is in an operative position.

3. A recorder pen according to claim 2 in which the reservoir consists essentially of a non-wettable plastic material and the top consists of a metal.

4. A recorder pen according to claim 3 in which the rigid capillary tube is substantially J-shaped.

5. A recorder pen according to claim 3 in which the vent tube has an L-shape with its longer portion extending outwardly from the reservoir to thereby facilitate the filling of said reservoir.

References Cited by the Examiner

UNITED STATES PATENTS

| | | | |
|---|---|---|---|
| 2,346,802 | 4/1944 | Walker | 346—62 |
| 2,800,385 | 7/1957 | Cannon | 346—140 |
| 2,973,237 | 2/1961 | Whiteley | 346—140 X |
| 3,146,058 | 8/1964 | Henshaw | 346—140 |

LEO SMILOW, *Primary Examiner.*